Oct. 8, 1946.   R. H. VARIAN ET AL   2,408,825

OBJECT DETECTING AND LOCATING SYSTEM

Filed March 25, 1943

INVENTORS
R. H. VARIAN
W. W. HANSEN
BY J. R. WOODYARD
ATTORNEY

Patented Oct. 8, 1946

2,408,825

UNITED STATES PATENT OFFICE 2,408,825

OBJECT DETECTING AND LOCATING SYSTEM

Russell H. Varian, Wantagh, and William W. Hansen and John R. Woodyard, Garden City, N. Y., assignors to The Board of Trustees of the Leland Stanford Junior University, Stanford University, Calif., a corporate body of California Original application September 30, 1941, Serial No. 412,918. Divided and this application March 25, 1943, Serial No. 480,574

6 Claims. (Cl. 250—11)

The present application is a division of application Serial No. 412,918, for Object detecting and locating system, filed September 30, 1941.

This invention relates, generally, to the detection and location of objects such as aerial targets and the invention has reference more particularly to a novel apparatus for counteracting the inertia of scanning antenna means whereby a substantially vibrationless rapid mechanical scanning of the antenna means is made possible.

The principal object of the present invention is to provide novel means for counteracting the inertia of scanning antenna means whereby substantially vibrationless rapid scanning is obtained.

Other objects and advantages will become apparent from the specification, taken in connection with the accompanying drawing wherein the invention is embodied in concrete form.

Figure 1:
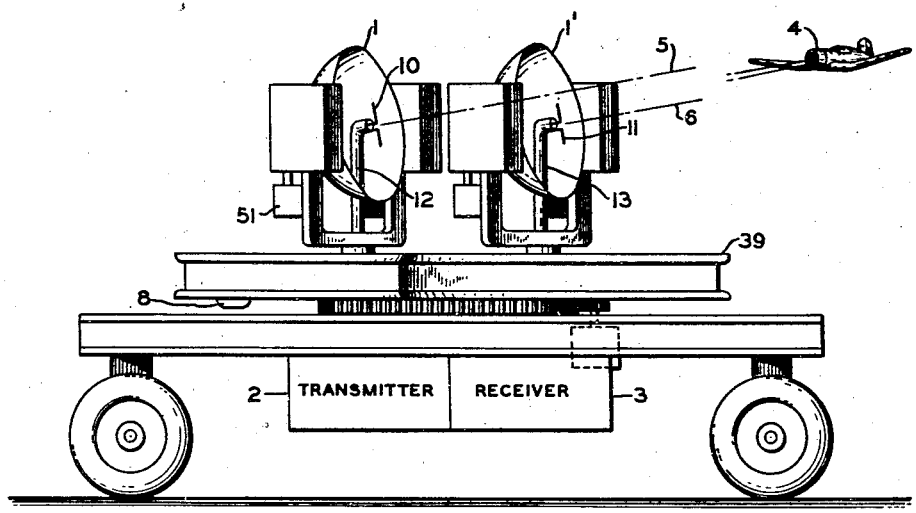
Fig. 1 is an elevational view of one form of the system of the present invention.
Figure 2:
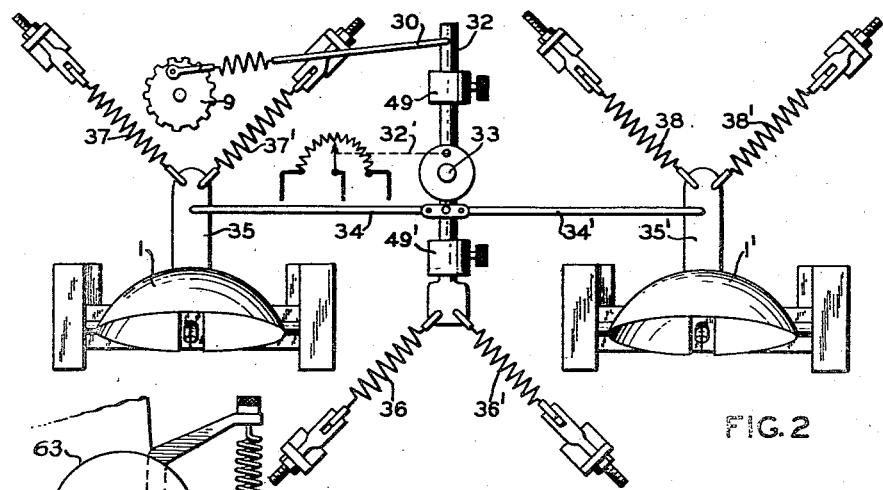
Fig. 2 is a schematic plan view of the structure of Fig. 1.

Referring now more particularly to Figs. 1 and 2, the transmitting and receiving reflectors I and I' are arranged to scan a desired field of view. Azimuthal scanning is accomplished by use of a motor 8 operating a crank disc 9 connected through spring link 30 to oscillate a bar 32 pivoted at 33. Bar 32 is connected by links 34, 34' to oscillate levers 35, 35' provided on reflectors I and I'. Springs 36 and 36' acting together with springs 37, 37' and 38, 38' tend to hold the reflectors I and I' in a desired direction, which is shown in Fig. 2 as tending to aim these reflectors directly ahead. These springs also serve to return these reflectors to this ahead position when the actuating force provided by link 30 is released. Thus, as crank disc 9 turns the bar 32, the connected reflectors I and I' will be given a reciprocatory or substantially simple harmonic motion. The tension of the springs 36, 36', 37, 37' and 38, 38' being so adjusted with respect to the mass of the system that a condition of mechanical resonance exists thereby greatly reducing the power necessary to operate the system. A type of system somewhat similar to this is disclosed in copending application of Joseph Lyman et al. Serial No. 406,494, filed August 12, 1941. However, the present invention goes further than the Lyman application in that means are provided for also greatly reducing or substantially eliminating vibration of the system, i. e., of the supporting platform 39 and connected parts. This is accomplished by providing weights 49 and 49' on the bar 32 on opposite sides of the pivot 33. It will be noted that when the bar 32 and attached weights are moving clockwise the reflectors I and I' are moving counterclockwise so that the momentum of bar 32 and connected weights serves to counterbalance the momentum of the reflectors I and I' and connected parts, whereby there is no vibrating torque applied to the base 39 so that this base does not vibrate as it would do otherwise.

Figure 3:
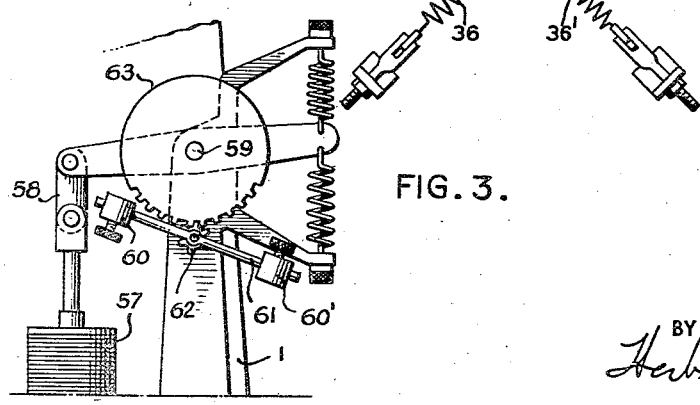
Fig. 3 is a detail elevational view showing means for effecting elevational scanning.

Elevational movement of the reflectors is shown in Fig. 3 accomplished by use of solenoids 57 acting through linkage 58 to oscillate the reflectors about their horizontal axis 59 in the manner described in the above mentioned Lyman et al. application. Means are also shown in Fig. 3 for compensating the vertical angular momentum of the reflectors by use of weights 60 and 60' mounted on a rod 61 and carried by pinion 62 driven by gear 63 fixed on the pivot 59 so that as this pivot turns in one direction the weights 60 and 60' are revolved in a reverse direction thereby compensating for the vertical angular momentum of the reflector I or I' as the case may be.

In order to present an indication of the azimuthal and elevation angles of the target 4, suitable pick-offs are provided in connection with one of the reflectors I and I'. Thus, in Fig. 2 a potentiometer arm 64 is actuated from link 32' which arm moves over a potentiometer 65 connected in the manner disclosed in the above-mentioned Lyman application for varying the deflecting potentials on the horizontal deflected plates of a cathode ray tube.

Since many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

What is claimed is:

1. In an apparatus of the character described a plurality of pivotally mounted reflectors, means for oscillating said reflectors about their pivotal mountings, and inertia means connected to said oscillating means for counteracting the inertia of said reflectors, whereby vibration of the system is substantially eliminated.

2. Apparatus of the character described in claim 1 wherein said reflectors are normally biased to a desired position by resilient means, said resilient means serving to impart reciprocatory motion to said reflectors and connected parts.

3. In apparatus of the character described, scanning antenna means comprising an antenna reflector, means for pivotally mounting said reflector for universal movement substantially about the focus thereof, resilient means connected for directing said reflector in an initial direction, motive means connected to said reflector for oscillating the same to scan a field of view whose center lies in said initial direction, and inertia means connected to said motive means for counteracting the inertia of said reflector, whereby vibration of the system is substantially eliminated.

4. In apparatus of the character described, a radiator of electromagnetic energy, means for oscillating said radiator, and inertia means connected to said oscillating means for counteracting the inertia of said radiator means.

5. In combination, a radiator of electromagnetic energy, means for oscillating said radiator, pivotally mounted inertia means, and rotation reversing means connecting said inertia means to said radiator for counteracting the inertia of said radiator means.

6. In combination, a radiator of electromagnetic energy mounted upon first and second transverse axes and adapted to be oscillated about each of said axes for scanning, a first rotatably mounted inertia means, having a rotation axis parallel to the first radiator rotation axis and connected to said radiator for counteracting the inertia of the radiator means with respect to the first axis, and a second inertia means rotatably mounted with a rotation axis parallel to the second radiator rotation axis and connected to said radiator for counteracting the inertia of said radiator means with respect to the second radiator rotation axis.

RUSSELL H. VARIAN.
WILLIAM W. HANSEN.
JOHN R. WOODYARD.